United States Patent
Umetsu et al.

[11] Patent Number: 6,046,300
[45] Date of Patent: Apr. 4, 2000

[54] LIQUID-CRYSTALLINE RESIN AND THERMOPLASTIC RESIN COMPOSITION

[75] Inventors: Hideyuki Umetsu; Yoshiki Makabe; Masahiro Sugimura, all of Nagoya, Japan

[73] Assignee: Toray Industries, Inc., Japan

[21] Appl. No.: 09/215,075

[22] Filed: Dec. 18, 1998

[30] Foreign Application Priority Data

Dec. 26, 1997 [JP] Japan ................................. 9-359079

[51] Int. Cl.[7] .................................................. C08G 63/00
[52] U.S. Cl. ...................... 528/176; 528/193; 528/271; 528/272
[58] Field of Search .................... 528/176, 193, 528/271, 272

[56] References Cited

U.S. PATENT DOCUMENTS

| | | | |
|---|---|---|---|
| 5,194,569 | 3/1993 | Kim et al. | 528/206 |
| 5,241,036 | 8/1993 | Hsiue et al. | 528/27 |
| 5,258,486 | 11/1993 | Kim et al. | 528/206 |
| 5,298,593 | 3/1994 | Fujiwara et al. | 528/277 |
| 5,326,831 | 7/1994 | Yezrielev et al. | 525/437 |
| 5,470,945 | 11/1995 | Markle et al. | 528/390 |
| 5,543,476 | 8/1996 | Jones et al. | 525/444 |

FOREIGN PATENT DOCUMENTS

| | | |
|---|---|---|
| 2-16150 | 1/1990 | Japan . |
| WO 93/23451 | 11/1993 | WIPO . |

OTHER PUBLICATIONS

Structure and Properties of Polyblends of a Thermotropic Liquid Crystalline Polymer with an Alloy of Polyamide–6 and ABS, G. Sawhney, S.K. Gupta and A. Misra, Journal of Applied Polymer Scientce, vol. 62, 1395–1405 (1996).

Structure and Properties of Molded Polyblends Containing Liquid Crystalline Polymers, D. Beery, S. Kenig and A. Siegmann, Polymer Engineering and Science, Mar. 1991, vol. 31, No. 6.

*Primary Examiner*—Terressa Mosley
*Attorney, Agent, or Firm*—Austin R. Miller

[57] ABSTRACT

A liquid-crystalline resin with ester bonds, which has a hydroxyl terminal concentration of not smaller than $15 \times 10^{-6}$ equivalents/g, and a thermoplastic resin composition comprising the liquid-crystalline resin.

20 Claims, No Drawings

LIQUID-CRYSTALLINE RESIN AND THERMOPLASTIC RESIN COMPOSITION

BACKGROUND OF THE INVENTION

1. Field of the Invention

The present invention relates to a liquid-crystalline resin with ester bonds having a hydroxyl terminal concentration of not smaller than $15 \times 10^{-6}$ equivalents/g, which is well dispersible in thermoplastic resins, and also to a thermoplastic resin composition as improved with said liquid-crystalline resin, as well as to moldings, films and fibers of the composition.

2. Description of the Prior Art

There is increasing a great demand for high-quality plastics in these days, and a large number of polymers having various novel characteristics have been developed and put on the market. Of those, optically-anisotropic, liquid-crystalline polymers characterized by the parallel orientation of molecular chains are specifically noticed, as having high fluidity and good mechanical properties. In particular, as the polymers of those types have especially high strength and stiffness, there is much increasing a great demand for small-sized moldings of the polymers in the field of electrical engineering and electronics and also in the field of office appliances.

Examples of LCP of which the terminal concentration is defined are disclosed in Japanese Patent Application Laid-Open (JP-A) Hei-2-16150. Various alloys with thermoplastic resins have been studied, for example, as in Polymer Engineering and Science, 1991, Vol. 31, No. 6, and in Journal of Applied Polymer Science, Vol. 62, 1996.

However, even though the carboxyl terminal concentration in LCP is increased, as in JP-A Hei-2-16150, the strength of LCP could not be increased but the thermal stability thereof during molding is rather lowered.

It has been found that the liquid-crystalline polyesters used in the literature noted above are dispersed in thermoplastic resins in the form of large grains, often forming coarse aggregates. As a result, the moldings of the resin compositions containing such large, liquid-crystalline polyester grains have low impact strength, the films of the compositions are often broken, and the threads thereof are often cut.

SUMMARY OF THE INVENTION

The subject matter of the present invention is to provide a liquid-crystalline resin which is free from the problems noted above, which is workable at temperatures at which conventional thermoplastic resins are worked, and which, when combined with a thermoplastic resin, is effective for making the resulting resin composition have additional characteristics of high strength, dwell-time yellowing resistance in working, improved molding stability (to reduce the yield of failed moldings owing to the shortage of the resin composition being fed into molds), and by the improved surface appearance of moldings of the composition, and also to provide a resin composition comprising the liquid-crystalline resin and a thermoplastic resin.

We, the present inventors have assiduously studied so as to achieve the subject matter noted above, and have completed the present invention.

Specifically, the invention provides the following:

(1) A liquid-crystalline resin with ester bonds, which has a hydroxyl terminal concentration of not smaller than $15 \times 10^{-6}$ equivalents/g.

(2) The liquid-crystalline resin of (1), which contains p-hydroxybenzoic acid residues.

(3) The liquid-crystalline resin of (1), which contains ethylenedioxy units.

(4) The liquid-crystalline resin of (1), which comprises a liquid-crystalline polyester having structural units of the following (I), (III) and (IV), and/or a liquid-crystalline polyester having structural units of the following (I), (II), (III) and (IV):

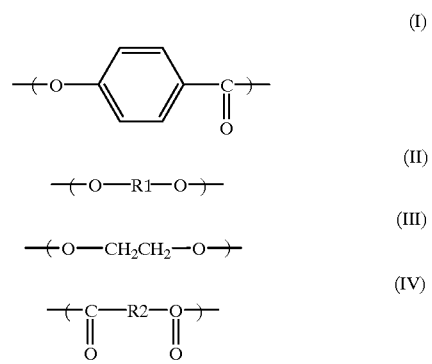

wherein R1 represents at least one or more groups selected from the following group consisting of:

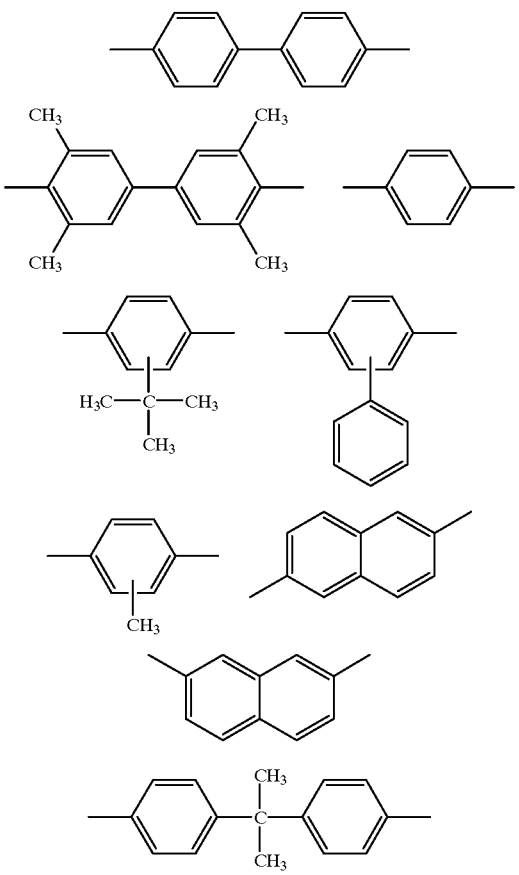

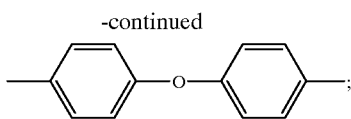

R2 represents at least one or more groups selected from the following group consisting of:

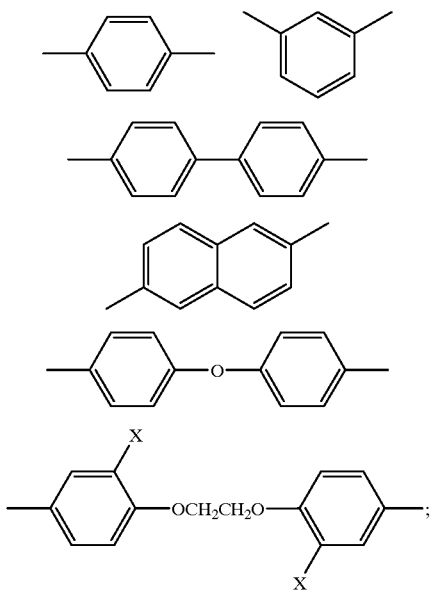

X represents a hydrogen atom or a chlorine atom.

(5) The liquid-crystalline resin of (4), wherein the total of the structural units (I) and (II) is 35 to 95 mol % of the total of the structural units (I), (II) and (III), the structural units (III) are 5 to 65 mol % of the total of the structural units (I), (II) and (III), the molar ratio of the structural units (I) to (II), (I)/(II), is 70/30 to 95/5, and the structural units (IV) are substantially equimolar to the total of the structural units (II) and (III).

(6) A liquid-crystalline resin composition comprising 100 parts by weight of the liquid-crystalline resin of (1) and 5 to 300 parts by weight of a filler.

(7) A thermoplastic resin composition comprising 100 parts by weight of a thermoplastic resin and 0.01 to 30 parts by weight of the liquid-crystalline resin of (1).

(8) A thermoplastic resin composition of (7) further comprising 5 to 300 parts by weight of a filler relative to 100 parts by weight of the total amounts of the thermoplastic resin and the liquid-crystalline resin.

(9) The thermoplastic resin composition of (7), wherein the liquid-crystalline resin has a number-average molecular weight of not larger than 5000.

(10) A thermoplastic resin composition comprising 100 parts by weight of a thermoplastic resin and 0.01 to 30 parts by weight of a liquid-crystalline resin having a hydroxyl terminal concentration of not smaller than $15 \times 10^{-6}$ equivalents/g, of which the tensile strength as measured according to the method of ASTM D638 (for a sheet sample of the composition having a thickness of ⅛ inches) is at least 5% higher than that of the thermoplastic resin not combined with the liquid-crystalline resin.

(11) Moldings of the thermoplastic resin composition of (7).

(12) Films of the thermoplastic resin composition of (7).

(13) Fibers of the thermoplastic resin composition of (7).

DESCRIPTION OF PREFERRED EMBODIMENTS OF THE INVENTION

Preferred embodiments of the invention are described hereinunder. "Weight" as referred to herein is by "mass".

The liquid-crystalline resin of the invention has ester bonds and is capable of forming an anisotropic melt phase. It includes, for example, a liquid-crystalline polyester that comprises structural units selected from aromatic oxycarbonyl units, aromatic dioxy units, aromatic and/or aliphatic dicarbonyl units, alkylenedioxy units and the like, and is capable of forming an anisotropic melt phase; and a liquid-crystalline polyesteramide that comprises structural units selected from those mentioned above, and aromatic iminocarbonyl units, aromatic diimino units, aromatic iminoxy units and the like, and is capable of forming an anisotropic melt phase, and the liquid-crystalline resin has a hydroxyl terminal concentration of not smaller than $15 \times 10^{-6}$ equivalents/g.

The aromatic oxycarbonyl units are, for example, those derived from p-hydroxybenzoic acid, 6-hydroxy-2-naphthoic acid, etc.; the aromatic dioxy units are, for example, those derived from 4,4'-dihydroxybiphenyl, hydroquinone, 3,3',5,5'-tetramethyl-4,4'-dihydroxybiphenyl, t-butylhydroquinone, phenylhydroquinone, 2,6-dihydroxynaphthalene, 2,7-dihydroxynaphthalene, 2,2-bis(4-hydroxyphenyl)propane, 4,4'-dihydroxydiphenyl ether, etc.; the aromatic and/or aliphatic dicarbonyl units are, for example, those derived from terephthalic acid, isophthalic acid, 2,6-naphthalenedicarboxylic acid, 4,4'-diphenyldicarboxylic acid, 1,2-bis(phenoxy)ethane-4,4'-dicarboxylic acid, 1,2-bis(2-chlorophenoxy)ethane-4,4'-dicarboxylic acid, 4,4'-diphenyl ether-dicarboxylic acid, adipic acid, sebacic acid, etc.; the alkylenedioxy units are, for example, those derived from ethylene glycol, 1,3-propanediol, 1,4-butanediol, etc., but preferably from ethylene glycol; and the aromatic iminoxy units are, for example, those derived from 4-aminophenol, etc.

As specific examples of the liquid-crystalline polyester, mentioned are liquid-crystalline polyesters comprising structural units derived from p-hydroxybenzoic acid, those from 6-hydroxy-2-naphthoic acid, and those from aromatic dihydroxy compounds and/or aliphatic dicarboxylic acids; liquid-crystalline polyesters comprising structural units derived from p-hydroxybenzoic acid, those from 4,4'-dihydroxybiphenyl, and those from terephthalic acid and adipic acid; liquid-crystalline polyesters comprising structural units derived from p-hydroxybenzoic acid, those from ethylene glycol, and those from terephthalic acid and isophthalic acid; liquid-crystalline polyesters comprising structural units derived from p-hydroxybenzoic acid, those from ethylene glycol, those from 4,4'-dihydroxybiphenyl, and those from terephthalic acid and/or sebacic acid; and liquid-crystalline polyesters comprising structural units derived from p-hydroxybenzoic acid, those of ethylene glycol, those from aromatic dihydroxy compounds, and those from aromatic dicarboxylic acids such as terephthalic acid, isophthalic acid, 2,6-naphthalene-dicarboxylic acid, etc.

Preferred examples of the liquid-crystalline polyesters capable of forming an anisotropic melt phase are liquid-crystalline polyesters comprising structural units of the following (I), (II), (III) and (IV), and liquid-crystalline polyesters comprising structural units of the following (I), (III) and (IV) and capable of forming an anisotropic melt phase. Of those, especially preferred are the liquid-crystalline polyesters comprising the structural units of (I), (II), (III) and (IV).

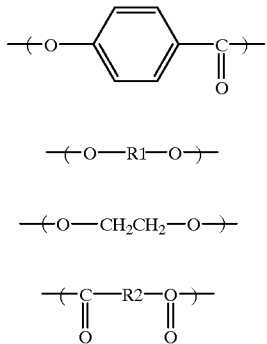

wherein R1 represents at least one or more groups selected from the following group consisting of:

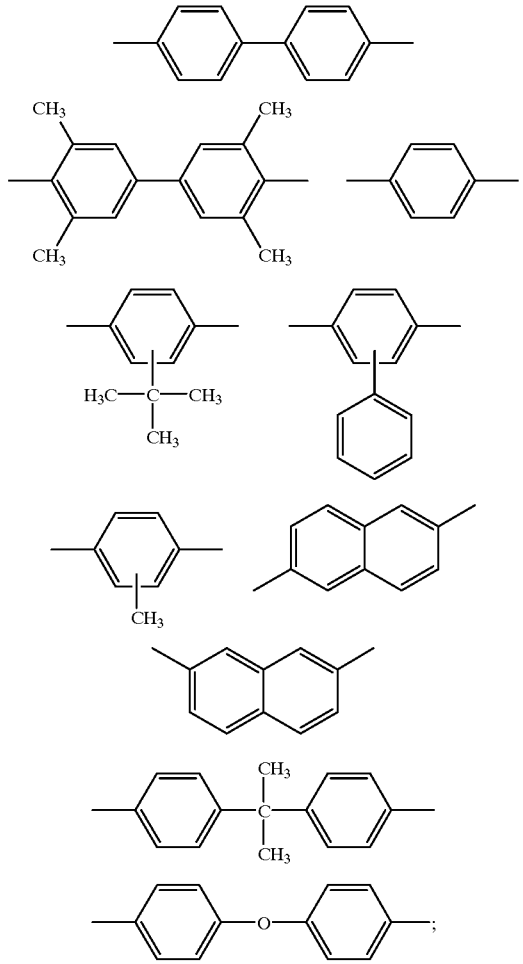

R2 represents at least one or more groups selected from the following group consisting of:

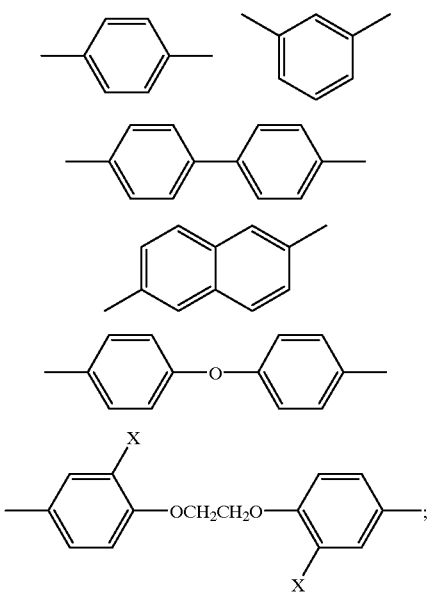

X represents a hydrogen atom or a chlorine atom.

The structural unit (I) is derived from p-hydroxybenzoic acid; the structural unit (II) is from an aromatic dihydroxy compound selected from 4,4'-dihydroxybiphenyl, 3,3',5,5'-tetramethyl-4,4'-dihydroxybiphenyl, hydroquinone, t-butylhydroquinone, phenylhydroquinone, methylhydroquinone, 2,6-dihydroxynaphthalene, 2,7-dihydroxynaphthalene, 2,2-bis(4-hydroxyphenyl)propane and 4,4'-dihydroxydiphenyl ether; the structural unit (III) is from ethylene glycol; and the structural unit (IV) is from an aromatic dicarboxylic acid selected from terephthalic acid, isophthalic acid, 4,4'-diphenyldicarboxylic acid, 2,6-naphthalene-dicarboxylic acid, 1,2-bis(phenoxy)ethane-4,4'-dicarboxylic acid, 1,2-bis(2-chlorophenoxy)ethane-4,4'-dicarboxylic acid and 4,4'-diphenyl ether-dicarboxylic acid. Of the structural units mentioned above, especially preferred are those where R1 is the following:

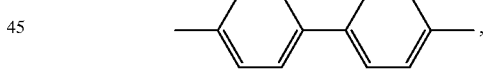

and R2 is the following:

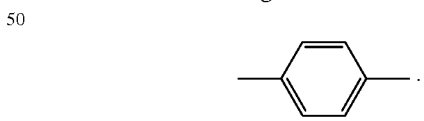

Preferred liquid-crystalline polyesters for use in the invention are the copolymers comprising the structural units (I), (III) and (IV), and the copolymers comprising the structural units (I), (II), (III) and (IV), in which the copolymerizing ratio of those units (I), (II), (III) and (IV) may be freely defined. However, in order to obtain good results of the invention, the copolymerizing ratio is preferably as follows:

In the copolymers comprising the structural units of (I), (II), (III) and (IV), the total of the structural units (I) and (II) is preferably 30 to 95 mol %, more preferably 40 to 85 mol % of the total of the structural units (I), (II) and (III). The structural units (III) are preferably 5 to 70 mol %, more preferably 15 to 60 mol % of the total of the structural units (I), (II) and (III). The molar ratio of the structural units (I) to (II), (I)/(II), is preferably 75/25 to 95/5, more preferably 78/22 to 93/7. Preferably, the structural units (IV) are substantially equimolar to the total of the structural units (II) and (III).

On the other hand, in the copolymers not containing the structural units (III), the structural units (I) are preferably 40 to 90 mol %, more preferably 60 to 88 mol % of the total of the structural units (I) and (II), in view of the fluidity of the copolymers. In these, it is desirable that the structural units (IV) are substantially equimolar to the structural units (II).

Liquid-crystalline polyester-amides are also usable in the invention, which comprise p-iminophenoxy units to be derived from p-aminophenols, in addition to the structural units (I) to (IV) noted above, and which are capable of forming an anisotropic melt phase.

The liquid-crystalline polyesters and polyester-amides which are preferably used in the invention may comprise, in addition to the structural units (I) to (IV) mentioned above, any other structural units from comonomers of, for example, aromatic dicarboxylic acids such as 3,3'-diphenyldicarboxylic acid, 2,2'-diphenyldicarboxylic acid, etc.; aliphatic dicarboxylic acids such as adipic acid, azelaic acid, sebacic acid, dodecane-dicarboxylic acid, etc.; alicyclic dicarboxylic acids such as hexahydroterephthalic acid, etc.; aromatic diols such as chlorohydroquinone, 3,4'-dihydroxybiphenyl, 4,4'-dihydroxydiphenylsulfone, 4,4'-dihydroxydiphenylsulfide, 4,4'-dihydroxybenzophenone, etc.; aliphatic and alicyclic diols such as propylene glycol, 1,4-butanediol, 1,6-hexanediol, neopentyl glycol, 1,4-cyclohexanediol, 1,4-cyclohexane-dimethanol, etc.; aromatic hydroxycarboxylic acids such as m-hydroxybenzoic acid, 2,6-hydroxynaphthoic acid, etc.; as well as p-aminobenzoic acid and the like, so far as the additional comonomer units do not interfere with the liquid-crystalline property of the copolymers.

Methods for producing the liquid-crystalline polyesters and polyester-amides for use in the invention are not specifically defined, and the polyesters and polyester-amides can be produced in accordance with any known polycondensation methods for producing conventional polyesters and polyester-amides.

For example, the liquid-crystalline polyesters noted above can be preferably produced by the following methods.

(1) A polyester is prepared from components except oxycarbonyl unit-forming monomers such as p-hydroxybenzoic acid and the like, then this is heated and melted with p-acetoxybenzoic acid in a dry nitrogen stream atmosphere to form copolymerized polyester fragments through acidolysis, and thereafter the viscosity of the resulting copolyester is increased under reduced pressure.

(2) Those are produced by deacetylating polycondensation from p-acetoxybenzoic acid, a diacylated aromatic dihydroxy compound such as 4,4'-diacetoxybiphenyl, diacetoxybenzene, or the like, and an aromatic dicarboxylic acid such as 2,6-naphthalene dicarboxylic acid, terephthalic acid, isophthalic acid, or the like.

(3) Those are produced by deacetylating polycondensation from p-hydroxybenzoic acid, an aromatic dihydroxy compound such as 4,4'-dihydroxybiphenyl, hydroquinone, or the like, and an aromatic dicarboxylic acid such as 2,6-naphthalene-dicarboxylic acid, terephthalic acid, isophthalic acid, or the like with acetic anhydride followed by acylation of phenolic hydroxyl groups.

(4) Those are produced by dephenolating polycondensation from phenyl p-hydroxybenzoate, an aromatic dihydroxy compound such as 4,4'-dihydroxybiphenyl, hydroquinone, or the like, and a diphenyl ester of an aromatic dicarboxylic acid such as 2,6-naphthalene dicarboxylic acid, terephthalic acid, isophthalic acid, or the like.

(5) P-hydroxybenzoic acid and an aromatic dicarboxylic acid such as 2,6-naphthalene-dicarboxylic acid, terephthalic acid, isophthalic acid or the like are reacted with a predetermined amount of diphenyl carbonate to prepare a diphenyl ester, and then reacted with an aromatic dihydroxy compound such as 4,4'-dihydroxybiphenyl, hydroquinone or the like for dephenolating polycondensation.

(6) The method of (2) or (3) is effected in the presence of a polymer or oligomer of a polyester such as polyethylene terephthalate or the like, or in the presence of a bis(b-hydroxyethyl) ester of an aromatic dicarboxylic acid such as bis(b-hydroxyethyl) terephthalate or the like.

In order to produce the intended liquid-crystalline polyesters having a hydroxyl terminal concentration of not smaller than $15 \times 10^{-6}$ equivalents/g, preferably employed is the method of any of (1) to (6) noted above in which the hydroxyl component is 0.01 to 1 mol % excessive over the carboxylic acid component; or the method of any of (1) to (6) in which the polymer produced shall have a degree of polymerization that is higher than the intended degree of polymerization, and water or a glycol component is added to the polymer through a plunger pump or the like with stirring the resulting polymer at normal pressure; or the method of any of (1) to (6) in which 0.01 to 5 parts by weight of water or a glycol component is added to the polymer produced and the resulting polymer is melted and pelletized in a kneader, a single-screw or double-screw extruder or the like at a temperature of 180 to 380° C.

The polycondensation for producing the liquid-crystalline resin may be effected in the absence of a catalyst, for which, however, usable is a metal compound such as stannous acetate, tetrabutyl titanate, potassium acetate, sodium acetate, antimony trioxide or the like, or even a metal of magnesium.

It is indispensable that the liquid-crystalline resin of the invention has a hydroxyl terminal concentration of not smaller than $15 \times 10^{-6}$ equivalents/g, preferably not smaller than $25 \times 10^{-6}$ equivalents/g, more preferably not smaller than $50 \times 10^{-6}$ equivalents/g. If its hydroxyl terminal concentration is smaller than $15 \times 10^{-6}$ equivalents/g, the liquid-crystalline resin could no more be an improver for thermoplastic resins. The uppermost limit of the hydroxyl terminal concentration of the liquid-crystalline resin is not specifically defined, but is preferably up to $1000 \times 10^{-6}$ equivalents/g, in view of the thermal stability of the liquid-crystalline resin.

To measure the hydroxyl terminal concentration in the liquid-crystalline resin of the invention, for example, 250 mg of a resin sample is weighed in an NMR test tube, to which is added 2.5 ml of a solvent (tetrachloroethane–d2/pentafluorophenol=4 ml/5 g) and heated (at 70 to 90° C.) thereby to dissolve the sample in the solvent, and the resulting resin solution in the test tube is measured for its hydroxyl terminal concentration in an NMR device at a frequency of 599.9 MHz.

The number-average molecular weight of the liquid-crystalline resin of the invention is not specifically defined. However, when the resin is used as an improver for thermoplastic resins, its number-average molecular weight is preferably 400 to 5000, more preferably 500 to 4000. The number-average molecular weight of the resin may be measured through GPC-LS (gel permeation chromatography-light scattering) for which is used a solvent capable of dissolving the resin.

The logarithmic viscosity of the liquid-crystalline resin of the invention can be measured in pentafluorophenol, which is preferably not smaller than 0.03 dl/g when measured therein at a concentration of 0.1 g/dl at 60° C. More preferably, it is 0.05 to 10.0 dl/g.

The melt viscosity of the liquid-crystalline resin of the invention is preferably 0.5 to 200 Pa•s, more preferably 1 to 100 Pa•s. Where resin compositions with better fluidity are to be obtained herein, the melt viscosity of the liquid-crystalline resin to be in those compositions is preferably 8 to 25 Pa•s.

The melt viscosity is measured, using a vertical flow tester, at a temperature of the melting point of the resin sample (Tm)+10° C. and at a shear rate of 1,000 $sec^{-1}$.

The melting point (Tm) is measured through differential calorimetry, in which the polymer sample having been at room temperature is first heated at a heating rate of 20 ° C./min to measure the temperature of the heat absorption peak (Tm1), then kept at a temperature of Tm1+20° C. for 5 minutes, then cooled down to room temperature at a cooling rate of 20° C./min, and thereafter again heated at a heating rate of 20° C./min to measure the temperature of the heat absorption peak (Tm2). The temperature Tm2 thus measured indicates the melting point of the sample.

The melting point of the liquid-crystalline resin of the invention is not specifically defined, but is preferably not higher than 350° C., more preferably not higher than 330° C., in view of the dispersibility of the resin in thermoplastic resins.

The thermoplastic resins to which the liquid-crystalline resin of the invention is added are synthetic resins which become fluid when heated and which can be molded because of their fluidity under heat. As specific examples of such thermoplastic resins, for example, mentioned are polyesters such as semi-aromatic non-liquid-crystalline polyesters, full-aromatic non-liquid-crystalline polyesters, liquid-crystalline polyesters, etc.; liquid-crystalline polyester-amides, polycarbonates, polyamides, polyoxymethylenes, full-aromatic polyamides, polyimides, polybenzimidazoles, polyketones, polyether-ether-ketones, polyether-ketones, polyether-sulfones, polyphenylene oxides, phenoxy resins, polyphenylene sulfides, phenolic resins, phenol-formaldehyde resins; olefinic polymers such as polypropylene, polyethylene, polystyrene, etc.; olefinic copolymers such as ethylene/propylene copolymers, ethylene/1-butene copolymers, ethylene/propylene/non-conjugated diene copolymers, ethylene/ethyl acrylate copolymers, ethylene/glycidyl methacrylate copolymers, ethylene/vinyl acetate/glycidyl methacrylate copolymers, ethylene/propylene-g-maleic anhydride copolymers, ABS, etc.; elastomers such as polyester-polyether elastomers, polyester-polyester elastomers, etc.; and mixtures of those resins. Examples of the polyester resins include polyethylene terephthalate, polypropylene terephthalate, polybutylene terephthalate, polyethylene-2,6-naphthalate, polybutylene naphthalate, poly-1,4-cyclohexylene-dimethylene terephthalate, polyethylene-1,2-bis(phenoxy)ethane-4,4'-dicarboxylate, etc.; and also copolyesters such as polyethylene isophthalate/terephthalate, polybutylene terephthalate/isophthalate, polybutylene terephthalate/decane-dicarboxylate, polycyclohexane-dimethylene terephthalate/isophthalate, etc. The polyamides include, for example, ring-cleaved polymers of cyclic lactams, polycondensates of aminocarboxylic acids, polycondensates of dicarboxylic acids with diamines, etc. As examples of such polyamides, mentioned are aliphatic polyamides such as nylon-6, nylon-4,6, nylon-6,6, nylon-6,10, nylon-6,12, nylon-11, nylon-12, etc.; aliphatic-aromatic polyamides such as poly(metaxylene-adipamide), poly(hexamethylene-terephthalamide), poly(hexamethylene-isophthalamide), poly(tetramethylene-isophthalamide), polynonane-methylene-terephthalamide, poly(methylpentamethylene-terephthalamide), etc.; and their copolymers and mixtures, such as nylon-6/poly(hexamethylene-terephthalamide), nylon-6,6/poly(hexamethylene-terephthalamide), poly(hexamethylene-isophthalamide)/poly(hexamethylene-terephthalamide), nylon-6/poly(hexamethylene-isophthalamide)/poly(hexamethylene-terephthalamide), nylon-12/poly(hexamethylene-terephthalamide), poly(methylpentamethylene-terephthalamide)/poly(hexamethylene-terephthalamide), etc.

Of those, preferred are, in view of their mechanical properties and moldability, polyesters such as polybutylene terephthalate, polybutylene naphthalate, poly-1,4-cyclohexylene-dimethylene terephthalate, polyethylene 2,6-naphthalate, polyethylene terephthalate, etc.; liquid-crystalline polyesters, liquid-crystalline polyester-amides; polyamides such as nylon-6, nylon-6,6, nylon-4,6, polynonane-methylene-terephthalamide, nylon-6/poly(hexamethylene-terephthalamide), nylon-6,6/poly(hexamethylene-terephthalamide), poly(hexamethylene-isophthalamide )/poly(hexamethylene-terephthalamide), nylon-6/poly (hexamethylene-isophthalamide)/poly(hexamethyleneterephthalamide), nylon-12/poly(hexamethylene-terephthalamide), poly(methylpentamethylene-terephthalamide)/poly(hexamethylene-terephthalamide), etc.; polycarbonates, polyphenylene-sulfides, polyethylenes, polypropylenes, polystyrenes, ABS, polyphenylene oxides, phenoxy resins, phenolic resins, phenol-formaldehyde resins; and their mixtures. More preferred are polybutylene terephthalate, polyethylene terephthalate, liquid-crystalline polyesters, liquid-crystalline polyester-amides, nylon-6, nylon-6,6, nylon-4,6, polynonane-methylene-terephthalamide, nylon-6/poly(hexamethylene-terephthalamide), nylon-6,6/poly(hexamethylene-terephthalamide), poly(hexamethylene-isophthalamide)/poly(hexamethylene-terephthalamide), nylon-6/poly (hex amethylene-isophthalamide)/poly(hexamethylene-terephthalamide), nylon-1 2/poly(hexamethylene-terephthalamide), poly(methylpentamethylene-terephthalamide)/poly(hexamethylene-terephthalamide), polycarbonates, polyphenylene sulfides, ABS, polyphenylene oxides, and their mixtures.

The amount of the liquid-crystalline resin of the invention that may be added to a thermoplastic resin and is capable of making the resulting resin composition have additional characteristics of high strength, dwell-time yellowing resistance in working, and improved surface appearance of moldings of the composition, without interfering with the intrinsic characteristics of the thermoplastic resin, is 0.01 to 30 parts by weight, preferably 0.05 to 20 parts by weight, more preferably 0.1 to 10 parts by weight relative to 100 parts by weight of the thermoplastic resin.

The method for mixing the liquid-crystalline resin of the invention with a thermoplastic resin is not specifically defined, but, in general, the two resins are preferably kneaded in melt. For the melt-kneading, employable is any known method. For example, the resins may be kneaded in melt at a temperature of 180 to 380° C., in any of Bumbury mixers, rubber rollers, kneaders, single-screw or double-screw extruders and the like, to give a resin composition.

A filler may be used in the invention for the purpose of improving the liquid-crystalline resin and also the thermoplastic resin composition comprising the liquid-crystalline resin of the invention, for example, for increasing the mechanical strength of the resin or the resin composition. The filler is not specifically defined, and any of fibrous, tabular, powdery or granular fillers are employable herein. Concretely, the filler for use in the invention includes fibrous or whisker-like fillers, for example, glass fibers, carbon fibers of PAN, pitch or the like, metal fibers such as stainless steel fibers, aluminium fibers, brass fibers, etc., organic fibers such as aromatic polyamide fibers, etc., as well as gypsum fibers, ceramic fibers, asbestos fibers, zirconia fibers, alumina fibers, silica fibers, titanium oxide fibers, silicon carbide fibers, rock wool, potassium titanate whiskers, barium titanate whiskers, aluminium borate whiskers, silicon nitride whiskers, etc.; and also other powdery, granular or tabular fillers of, for example, mica, talc, kaolin, silica, calcium carbonate, glass beads, glass flakes, glass microballoons, clay, molybdenum disulfide, wollastonite, titanium oxide, zinc oxide, calcium polyphosphate, graphite, etc. Of those fillers, preferred are glass fibers. The type of glass fibers for use in the invention is not specifically defined, and any and every one to be generally used for reinforcing resins is employable herein. For example, they may be selected from long-fiber type or short-fiber type, chopped strands and milled fibers, etc. Two or more of those fillers may be used in combination. The fillers for use in the invention may be surface-treated with any known coupling agents (e.g., silane coupling agents, titanate coupling agents, etc.) or any other surface-treating agents.

Glass fibers for use in the invention may be coated with a thermoplastic resin such as ethylene/vinyl acetate copolymer or the like, or with a thermosetting resin such as epoxy resin or the like, or may be bundled up therewith.

For reinforced liquid-crystalline resin compositions not containing any thermoplastic resins other than the specific liquid-crystalline resin of the invention, the amount of the filler to be in the compositions may be 5 to 300 parts by weight, preferably 10 to 250 parts by weight, more preferably 20 to 150 parts by weight, relative to 100 parts by weight of the liquid-crystalline resin therein. On the other hand, for reinforced thermoplastic resin compositions containing a thermoplastic resin in addition to the specific liquid-crystalline resin of the invention, the amount of the filler to be in the compositions may be 5 to 300 parts by weight, preferably 10 to 250 parts by weight, more preferably 20 to 150 parts by weight, relative to 100 parts by weight of the thermoplastic resin composition (comprised of the thermoplastic resin and the liquid-crystalline resin)

For the purpose of making the liquid-crystalline resin and the thermoplastic resin composition of the invention have flame retardancy, red phosphorus may be added to the resin and to the composition. As being unstable and gradually dissolving in water by itself, red phosphorus for use in the invention is preferably so processed that its negative properties are masked. To process red phosphorus for that purpose, for example, employable is any of a method of adding a minor amount of aluminium hydroxide or magnesium hydroxide to red phosphorus to thereby catalytically prevent the oxidation of red phosphorus; a method of coating red phosphorus with paraffin or wax to thereby inhibit the contact of red phosphorus with water; a method of mixing red phosphorus with e-caprolactam or trioxan to thereby stabilize it; a method of coating red phosphorus with a thermosetting resin of, for example, phenolic resins, melamine resins, epoxy resins, unsaturated polyester resins and the like, to thereby stabilize it; a method of processing red phosphorus with an aqueous solution of a metal salt of, for example, copper, nickel, silver, iron, aluminium, titanium or the like to thereby form a precipitate of the metal-phosphorus compound on the surface of red phosphorus to stabilize it; a method of coating red phosphorus with aluminium hydroxide, with an alkali metal or alkaline earth metal hydroxide, such as magnesium hydroxide or the like, or with any other metal hydroxide such as titanium hydroxide, zinc hydroxide or the like; a method of coating the surface of red phosphorus with iron, cobalt, nickel, manganese, tin or the like through electroless plating to thereby stabilize it; or a combination of those methods. Of those, preferred are the method of coating red phosphorus with a thermosetting resin of, for example, phenolic resins, melamine resins, epoxy resins, unsaturated polyester resins and the like, to thereby stabilize it; and the method of coating red phosphorus with aluminium hydroxide, magnesium hydroxide, titanium hydroxide, zinc hydroxide or the like to thereby stabilize it. Especially preferred is the method of coating red phosphorus with a phenolic resin or titanium hydroxide.

The mean grain size of red phosphorus is, before it is added to the liquid-crystalline resin or to the thermoplastic resin composition, preferably 0.01 to 50 $\mu$m, more preferably 0.1 to 45 $\mu$m, in view of the flame retardancy, the mechanical strength and the surface appearance of the resin moldings to be obtained herein and for the purpose of preventing chemical and physical deterioration of red phosphorus in grinding and recycling the moldings.

The mean grain size of red phosphorus may be measured with any ordinary laser diffractometric, grain size distribution measuring device. Wet-type and dry-type grain size distribution measuring devices are known, and any of which is employable herein. In the wet-type device, water may be used as the dispersion solvent for red phosphorus. In this, red phosphorus may be surface-treated with alcohol or neutral detergent. As the dispersant, usable is a phosphate such as sodium hexametaphosphate, sodium pyrophosphate or the like. As the dispersing device, usable is an ultrasonic bath.

The preferred mean grain size of red phosphorus for use in the invention is as mentioned above. Large grains of red phosphorus having a grain size of 75 $\mu$m or more are unfavorable to the invention since they greatly worsen the flame retardancy, the mechanical properties, the wet heat resistance and the recyclability of the resin moldings to be produced herein. Therefore, it is desirable that such large grains of red phosphorus having a grain size of 75 $\mu$m or more are removed through classification or the like. Preferably, the amount of large grains having a grain size of 75 $\mu$m or more to be in red phosphorus for use in the invention is not larger than 10% by weight, more preferably not larger than 8% by weight, even more preferably not larger than 5% by weight. The lowermost limit of the large grains is not specifically defined, but the amount of the large grains is preferably as near to 0 (zero) as possible.

The amount of large grains having a grain size of 75 $\mu$m or more to be in red phosphorus may be measured by classification through a 75 $\mu$m-mesh sieve. Briefly, 100 g of red phosphorus is classified through a 75 $\mu$m-mesh sieve to obtain the weight, A (g), of the residue, and the ratio of large grains having a grain size of 75 $\mu$m or more in the red phosphorus is represented by A/100×1000(%).

The electroconductivity of red phosphorus for use in the invention is, after it has been extracted in hot water, generally 0.1 to 1000 $\mu$s/cm, but preferably 0.1 to 800 $\mu$S/cm, more preferably 0.1 to 500 $\mu$S/cm, in view of the flame retardancy, the moisture resistance, the mechanical strength, the anti-tracking property and the non-coloring property of the resin moldings to be obtained herein. (The electroconductivity is obtained by adding 100 ml of pure water to 5 g of red phosphorus, extracting it in an autoclave at 121° C. for 100 hours, filtering it, and diluting the resulting filtrate to be 250 ml. The electroconductivity of the resulting dilution is measured.)

The amount of phosphine to be generated by red phosphorus for use in the invention (phosphine generation by red phosphorus) is generally not larger than 100 ppm, but preferably not higher than 50 ppm, more preferably not higher than 20 ppm, in view of the amount of gas to be generated by the resin composition, the stability of the composition being molded through extrusion, the mechanical strength of the melt of the composition during the residence time, the outward appearance of the resin moldings formed, and the corrosion of terminals by the moldings. (The phosphine generation is obtained by putting 5 g of red phosphorus into a 500 ml-container having been purged with nitrogen, such as a test tube, degassing the container to be at 10 mmHg, heating it at 280° C. for 10 minutes, then cooling it to be at 25° C., diluting the gas in the container (test tube) with nitrogen gas to be at 760 mmHg, and measuring the phosphine content by the use of a phosphine (hydrogen phosphide) detector. The phosphine generation is represented by the equation of phosphine generation (ppm)= detector value (ppm)×degree of dilution.)

As commercial products of red phosphite, of which the grain size, the electroconductivity and the phosphine generation are all within the preferred ranges noted above, mentioned are "Novaexcell" 140 and "Novaexcell" F5 manufactured by Rin Kagaku Kogyo KK.

The amount of red phosphorus to be added to the liquid-crystalline resin or to the thermoplastic resin composition of the invention is generally 0.01 to 30 parts by weight, but preferably 0.05 to 20 parts by weight, more preferably 0.06 to 10 parts by weight, even more preferably 0.08 to 5 parts by weight, relative to 100 parts by weight of the resin component. If its amount is too small, red phosphorus could not exhibit its flame-retarding ability; but if too large, the physical properties of the resin and the resin composition are lowered and, in addition, too much red phosphorus added will act as a combustion promoter rather than acting for flame retardation.

A metal oxide acting as a stabilizer for red phosphorus may be added to the liquid-crystalline resin or to the thermoplastic resin composition of the invention, whereby the stability and the strength of the resin or the composition being extruded and molded, as well as the heat resistance of the resin and the composition, and even the terminal corrosion resistance of the resin moldings may be further improved. Specific examples of the metal oxide include cadmium oxide, zinc oxide, cuprous oxide, cupric oxide, ferrous oxide, ferric oxide, cobalt oxide, manganese oxide, molybdenum oxide, tin oxide, titanium oxide, etc. Of those, preferred are metal oxides except those of Group I and/or Group II metals, such as cadmium oxide, cuprous oxide, cupric oxide, titanium oxide, etc. More preferred are cuprous oxide, cupric oxide and titanium oxide. However, Group I and/or Group II metal oxides are also employable. Most preferred is titanium oxide, in order to much more improve the stability and the strength of the resin and the composition being extruded and molded, the heat resistance of the resin and the composition, the terminal corrosion resistance of the resin moldings, and even the non-coloring property of the resin and the composition.

The amount of the metal oxide to be added is preferably 0.01 to 20 parts by weight, more preferably 0.1 to 10 parts by weight, relative to 100 parts by weight of the liquid-crystalline resin or the resin component in the thermoplastic resin composition, in view of the mechanical properties and the moldability of the resin and the composition.

A fluorine resin may be added to the liquid-crystalline resin or to the thermoplastic resin composition of the invention, whereby dripping of liquid drops is prevented when the resin or the composition is fired. The fluorine resin includes, for example, polytetrafluoroethylenes, polyhexafluoropropylenes, (tetrafluoroethylene/hexafluoropropylene) copolymers, (tetrafluoroethylene/perfluoroalkyl vinyl ether) copolymers, (tetrafluoroethylene/ethylene) copolymers, (hexafluoropropylene/propylene) copolymers, polyvinylidene fluorides, (vinylidene fluoride/ethylene) copolymers, etc. Of those, preferred are polytetrafluoroethylenes, (tetrafluoroethylene/perfluoroalkyl vinyl ether) copolymers, (tetrafluoroethylene/hexafluoropropylene) copolymers, (tetrafluoroethylene/ethylene) copolymers, and polyvinylidene fluorides; and more preferred are polytetrafluoroethylenes and (tetrafluoroethylene/ethylene) copolymers.

The amount of the fluorine resin to be added is generally 0.01 to 10 parts by weight, but preferably 0.1 to 5 parts by weight, more preferably 0.2 to 3 parts by weight, relative to 100 parts by weight of the liquid-crystalline resin or the resin component in the thermoplastic resin composition, in view of the mechanical properties and the moldability of the resin and the composition.

The liquid-crystalline resin and the thermoplastic resin composition of the invention may contain any ordinary additives, for example, antioxidants and heat stabilizers (e.g., hindered phenols, hydroquinones, phosphites and their substituents, etc.); ultraviolet absorbents (e.g., resorcinols, salicylates, benzotriazoles, benzophenones, etc.); coloration inhibitors such as phosphites, hypophosphites, etc.; lubricants and mold-release agents (e.g., montanic acid and its salts, esters and half-esters, stearyl alcohol, stearamides, polyethylene wax, etc.); colorants containing dye (e.g., Nigrosine, etc.) and pigment (e.g., cadmium sulfide, phthalocyanine, etc.); electroconductive agents and colorants such as carbon black, etc.; nucleating agents; plasticizers; flame retardants, preferably red phosphorus, but any other flame retardants (e.g., polystyrene bromides, polyphenylene ether bromides, polycarbonate bromides, magnesium hydroxide, melamine, cyanuric acid and its salts, etc.); flame retardation promoters; antistatic agents; etc. Those additives may impart predetermined characteristics to the resin and to the composition.

In accordance with the necessity of further improving the properties of the liquid-crystalline resin and the thermoplastic resin composition of the invention, one or more selected from acid-modified olefinic polymers with maleic anhydride or the like; olefinic copolymers such as ethylene/propylene copolymers, ethylene-1-butene copolymers, ethylene/propylene/non-conjugated diene copolymers, ethylene/ethyl acrylate copolymers, ethylene/glycidyl methacrylate copolymers, ethylene/vinyl acetate/glycidyl methacrylate copolymers, ethylene/propylene-g-maleic anhydride copolymers, ABS, etc.; and elastomers such as polyester-polyether elastomers, polyester-polyester elastomers, etc. may be added to the resin or to the composition, thereby imparting predetermined characteristics to the resin and to the composition.

To add them to the resin or to the composition, the additives are preferably kneaded with the resin or the composition in melt. For the melt-kneading, employable is any known method. For example, using any of Bumbury mixers, rubber rollers, kneaders, single-screw or double-screw extruders or the like, they are kneaded with the resin or the composition in melt at a temperature of 180 to 380° C. To mix them, for example, a liquid-crystalline resin, a thermoplastic resin, a filler and other additives may be mixed all at a time; or a liquid-crystalline resin and a thermoplastic resin are first mixed, and a filler and other additives may be added to the resulting mixture. Where red phosphorus is added to the resin or the resin composition of the invention, it is desirable that red phosphorus is first added to a liquid-crystalline resin or to a thermoplastic resin along with a filler and other additives, or alternatively, a high-concentration red phosphorus master with a liquid-crystalline resin or a thermoplastic resin is first prepared, and this is added to the resin or the resin composition. The method of preparing the red phosphorus master is not specifically defined, but preferred is a red phosphorus master with a liquid-crystalline resin as having better dispersibility in the thermoplastic resin composition.

The tensile strength of the liquid-crystalline resin-containing, thermoplastic resin composition thus obtained in the invention, as measured according to the method of ASTM D638 (for a sheet sample of the composition having a thickness of ⅛ inches) is at least 5 % higher than that of the thermoplastic resin not combined with the liquid-crystalline resin of the invention.

To produce moldings of the resin and the resin composition of the invention, employable are any ordinary molding methods of, for example, injection molding, extrusion molding, blow molding, press molding, injection-press molding or the like, in which are formed three-dimensional moldings, sheets, containers, pipes, etc. Especially preferred is injection molding or injection-press molding to produce moldings with thin parts having a thickness of not larger than 1.5 mm, more preferably to produce those with thin parts having a thickness of not larger than 1.2 mm, even more preferably to produce those with thin parts having a thickness of not larger than 1.0 mm. Films are also formed from the resin and from the resin composition of the invention through any ordinary methods of using T-dies or ring dies. The films may be non-drawn or non-oriented ones, but are preferably mono-axially or bi-axially drawn or heat-treated, oriented films as having higher elasticity, higher stiffness and higher heat resistance. These films may be single-layered ones, or may be laminated with any other polymer layers of, for example, polyesters, polyolefins, polyamides, polyvinylidene chlorides, acrylic polymers, etc. Fibers are also formed by spinning the resin or the resin composition of the invention, for which are employable any ordinary spinning methods of, for example, two-stage spinning-drawing, continuous one-stage spinning-drawing, high-speed draw-spinning not followed by additional drawing, or the like. The spinning and drawing steps do not require any specific limitations on the distribution of the degree of orientation, the presence or absence of yarn relaxation treatment, the temperature, etc. Needless-to-say, in the spinning methods, the total fineness, the number of filaments and even the profile of the cross section of each fiber are not specifically defined.

The thermoplastic resin composition comprising the liquid-crystalline resin of the invention is characterized by its high strength, dwell-time yellowing resistance in working, improved molding producibility (to reduce the yield of failed moldings owing to the shortage of the resin composition being fed into molds), and by the improved surface appearance of moldings of the composition. Owing to its characteristics, therefore, the resin composition can be molded into various moldings. The moldings are useful as parts for electric and electronic appliances, such as typically various gears, various cases, sensors, LED lamps, connectors, sockets, resistors, relay cases, switches, coil bobbins, capacitors, variable capacitor cases, optical pickups, oscillators, plates for various terminals, transformers, plugs, boards for printed circuits, tuners, speakers, microphones, headphones, small-sized motors, magnetic head bases, power modules, housings, semiconductors, parts for liquid crystal displays, FDD carriages, FDD chassis, HDD parts, motor brush holders, parabolic antennas, computer-related parts, etc.; parts for electric appliances for household and office use, such as typically VTR parts, TV parts, irons, hair driers, rice cooker parts, microwave range parts, acoustic parts, parts for sound appliances including audios, laser discs, compact discs, etc., lighting parts, refrigerator parts, air conditioner parts, typewriter parts, word processor parts, etc.; office computer-related parts, telephone-related parts, facsimile-related parts, duplicator-related parts, washing tools; machine-related parts, such as typically various bearings including oilless bearings, stem bearings, underwater bearings, etc., motor parts, lighters, typewriters, etc.; optical instrument-related parts and precision instrument-related parts, such as typically parts for microscopes, binoculars, cameras, watches, etc.; automobile and vehicle-related parts, such as typically alternator terminals, alternator connectors, IC regulators, potentiometer bases for Light Dia, various valves including exhaust gas valves, etc., various pipes for fuel-related intake and emission systems, air intake nozzle snorkels, intake manifolds, fuel pumps, engine-cooling water joints, carburetor main bodies, carburetor spacers, exhaust gas sensors, cooling water sensors, oil temperature sensors, brake pad wear sensors, throttle position sensors, crank shaft position sensors, air flow meters, parts for ignition coils, power sheet gear housings, thermostat bases for air conditioners, air flow control valves for heaters, brush holders for radiator motors, water pump impellers, turbine veins, wiper motor-related parts, distributors, starter switches, starter relays, wire harnesses for transmissions, windshield washer nozzles, air conditioner panel switch boards, coils for fuel-related electromagnetic valves, connectors for fuses, horn terminals, insulating boards for electric parts, step motor rotors, lamp sockets, lamp reflectors, lamp housings, brake pistons, solenoid bobbins, engine oil filters, ignition cases, etc.; box cases for personal computer housings, portable telephone housings, etc.; bathroom decorations for toilets, washstands, counters, etc.; toys; amusement facilities including parts for Pachinko (pinball game) stands, etc. In addition to those, they have many other applications. The films of the resin or the resin composition of the invention are useful as films for magnetic recording media, photographic films, films for capacitors, electric insulating films, wrapping films, drawing films, films for ribbons, etc. The fibers of the resin or the resin composition of the invention are useful as rubber-reinforcing fibers for tire cords, conveyor belts, hoses, etc., and are also useful for ropes, cables, speaker cones, tension members, non-woven fabrics, safety jackets, bulletproof vests, space suits, submarine suits, etc. In addition to those, they have many other applications.

Now, the invention is described in more detail with reference to the following Examples, to which, however, the invention is not restricted without departing from the spirit and scope thereof.

EXAMPLE 1 (A-1)

901 parts by weight of p-hydroxybenzoic acid, 126 parts by weight of 4,4'-dihydroxybiphenyl, 112 parts by weight of terephthalic acid, 346 parts by weight of polyethylene terephthalate having an intrinsic viscosity of about 0.6 dl/g, and 884 parts by weight of acetic anhydride were fed into a reactor equipped with a stirrer and a distillation tube, and reacted therein at 100 to 250° C. for 5 hours, and then at 250 to 300° C. for 1.5 hours, and thereafter the container was degassed to have a reduced pressure of 0.5 mmHg at 280° C. over a period of 1.5 hours, in which the compounds were further reacted for 1 hour to complete polycondensation. Next, 0.1 parts by weight of water was added to this, and the reaction product was pelletized through a double-screw extruder at a cylinder temperature of 280° C. As a result of this process, obtained was a liquid-crystalline resin comprising 72.5 molar equivalents of aromatic oxycarbonyl units, 7.5 molar equivalents of aromatic dioxy units, 20 molar equivalents of ethylenedioxy units, and 27.5 molar equivalents of aromatic dicarboxylic acid units, and having a hydroxy terminal concentration of $106 \times 10^{-6}$ equivalents/g. The resin had a logarithmic viscosity of 1.1 dl/g, a number-average molecular weight of about 13000 (as measured through GPC-LS using a solvent of pentafluorophenol/chloroform=35/65 (by weight)), a melting point of 256° C., and a melt viscosity of 16 Pa•s (as measured through an orifice of 0.5 $\phi \times 10$ mm at 266° C. and at a shear rate of 1,000 $sec^{-1}$).

EXAMPLE 2 (A-2)

528 parts by weight of p-hydroxybenzoic acid, 126 parts by weight of 4,4'-dihydroxybiphenyl, 112 parts by weight of terephthalic acid, 864 parts by weight of polyethylene terephthalate having an intrinsic viscosity of about 0.6 dl/g, and 581 parts by weight of acetic anhydride were fed into a reactor equipped with a stirrer and a distillation tube, and reacted therein at 100 to 250° C. for 5 hours, and then at 250 to 300° C. for 1.5 hours, and thereafter the container was degassed to have a reduced pressure of 0.5 mmHg at 280° C. over a period of 1.5 hours, in which the compounds were further reacted for 1 hour to complete polycondensation. Next, the reaction product was, after having been dry-blended with 0.1 parts by weight of water, pelletized through a double-screw extruder at a cylinder temperature of 280° C. As a result of this process, obtained was a liquid-crystalline resin comprising 42.5 molar equivalents of aromatic oxycarbonyl units, 7.5 molar equivalents of aromatic dioxy units, 50 molar equivalents of ethylenedioxy units, and 57.5 molar equivalents of aromatic dicarboxylic acid units, and having a hydroxy terminal concentration of $125 \times 10^{-6}$ equivalents/g. The resin had a logarithmic viscosity of 0.52 dl/g, a number-average molecular weight of about 3000 (as measured through GPC-LS using a solvent of pentafluorophenol/chloroform=35/65 (by weight)), a melting point of 205° C., and a melt viscosity of 9 Pa•s (as measured through an orifice of 0.5 $\phi \times 10$ mm at 215° C. and at a shear rate of 1,000 $sec^{-1}$)

EXAMPLE 3 (A-3)

745 parts by weight of p-hydroxybenzoic acid, 167 parts by weight of 4,4'-dihydroxybiphenyl, 150 parts by weight of isophthalic acid, 519 parts by weight of polyethylene terephthalate having an intrinsic viscosity of about 0.6 dl/g, and 816 parts by weight of acetic anhydride were fed into a reactor equipped with a stirrer and a distillation tube, and reacted therein at 100 to 250° C. for 5 hours, and then at 250 to 300° C. for 1.5 hours, and thereafter the container was degassed to have a reduced pressure of 0.5 mmHg at 280° C. over a period of 1.5 hours, in which the compounds were further reacted for 1 hour to complete polycondensation. Next, the reaction product was, after having been dry-blended with 0.1 parts by weight of water, pelletized through a double-screw extruder at a cylinder temperature of 270° C. As a result of this process, obtained was a liquid-crystalline resin comprising 60 molar equivalents of aromatic oxycarbonyl units, 10 molar equivalents of aromatic dioxy units, 30 molar equivalents of ethylenedioxy units, and 40 molar equivalents of aromatic dicarboxylic acid units, and having a hydroxy terminal concentration of $118 \times 10^{-6}$ equivalents/g. The resin had a logarithmic viscosity of 0.65 dl/g, a number-average molecular weight of about 4000 (as measured through GPC-LS using a solvent of pentafluorophenol/chloroform=35/65 (by weight)), a melting point of 223° C., and a melt viscosity of 12 Pa•s (as measured through an orifice of 0.5 $\phi \times 10$ mm at 233° C. and at a shear rate of 1,000 $sec^{-1}$).

COMPARATIVE EXAMPLE 1 (A-4)

901 parts by weight of p-hydroxybenzoic acid, 126 parts by weight of 4,4'-dihydroxybiphenyl, 112 parts by weight of terephthalic acid, 346 parts by weight of polyethylene terephthalate having an intrinsic viscosity of about 0.6 dl/g, and 884 parts by weight of acetic anhydride were fed into a reactor equipped with a stirrer and a distillation tube, and reacted therein at 100 to 250° C. for 5 hours, and then at 250 to 300° C. for 1.5 hours, and thereafter the container was degassed to have a reduced pressure of 0.5 mmHg at 280° C. over a period of 1.5 hours, in which the compounds were further reacted for 0.5 hours to complete polycondensation. As a result of this process, obtained was a liquid-crystalline resin comprising 72.5 molar equivalents of aromatic oxycarbonyl units, 7.5 molar equivalents of aromatic dioxy units, 20 molar equivalents of ethylenedioxy units, and 27.5 molar equivalents of aromatic dicarboxylic acid units, and having a hydroxy terminal concentration of not larger than $10 \times 10^{-6}$ equivalents/g. The resin had a logarithmic viscosity of 1.2 dl/g, a number-average molecular weight of about 17000 (as measured through GPC-LS using a solvent of pentafluorophenol/chloroform=35/65 (by weight)), a melting point of 256° C., and a melt viscosity of 36 Pa•s (as measured through an orifice of 0.5 $\phi \times 10$ mm at 266° C. and at a shear rate of 1,000 sec

COMPARATIVE EXAMPLE 2 (A-5)

In accordance with the teaching in JP-A Sho-54-77691, 1187 parts by weight of p-acetoxybenzoic acid and 434 parts by weight of 6-acetoxy-2-naphthoic acid were fed into a reactor equipped with a distillation tube, and reacted therein for polycondensation. Herein obtained was a liquid-crystalline resin comprising 100 molar equivalents of aromatic oxycarbonyl units and having a hydroxy terminal concentration of not larger than $10 \times 10^{-6}$ equivalents/g. The resin had a logarithmic viscosity of 5.04 dl/g, a number-average molecular weight of about 33000 (as measured through GPC-LS using a solvent of pentafluorophenol/chloroform=35/65 (by weight)), a melting point of 283° C., and a melt viscosity of 142 Pa•s (as measured through an orifice of 0.5 $\phi \times 10$ mm at 293° C. and at a shear rate of 1,000 $sec^{-1}$)

(1) Tensile Strength:
ASTM No. 1 test pieces for tensile test were prepared. Each test piece was tested for its tensile strength according to ASTM D638.

(2) Dwell-time Yellowing:
A resin sample was kept in a mold at a cylinder temperature shown in Table 1 for 15 minutes, and then molded into test pieces, whereupon the surface of each test piece was checked for gas yellowing.

×: Yellowed.

Δ: Discolored.

○: No change found.

(3) Molding Stability:

Pillar moldings (5×5×10 mm, 20 samples) were produced in a mold (in which 16 moldings are produced all at a time) at a cylinder temperature shown in Table 1 and under a pressure of (lowermost filling pressure+3 kgf/cm$^2$), whereupon the number of failed molding samples owing to filling failure and mold release failure was counted.

(4) Surface Appearance:

Square plates of 80×80×3 mm thick were produced through injection molding, and the image of a fluorescent lamp as reflected on the surface of each plate was visually checked for its sharpness. Based on the sharpness of the image, the surface smoothness of each plate was evaluated as follows:

○: The reflected image of the fluorescent lamp was sharp.

Δ: Though not sharp, the reflected image of the fluorescent lamp was seen.

×: No reflected image of the fluorescent lamp was seen.

EXAMPLES 4 TO 7, COMPARATIVE EXAMPLES 3 TO 6

LCP produced in any of Examples 1 to 3 and Comparative Examples 1 and 2 was dry-blended with a thermoplastic resin and a filler as in Table 1, kneaded in melt and pelletized through a 30 mm φ double-screw extruder. The pellets were molded into test pieces, using a Toshiba's molding machine, IS-55EPN. The test pieces were tested according to the methods mentioned above, and the test data obtained are shown in Table 1.

EXAMPLE 8

3 parts by weight of the liquid-crystalline resin of Example 1 was added to 100 parts by weight of polyamide resin (CM1021, manufactured by Toray Co.), and kneaded through a double-screw extruder. The resulting resin composition was press-shaped at 255 ° C. into a non-drawn film having a thickness of 100 μm. Using a T. M. Long's film stretcher, the film was biaxially drawn 3-fold in both the MD and TD directions at 90° C. The thus-drawn film was set in a Tensilon-type tensile strength tester (manufactured by Orientec Co.) in such a manner that its width was 10 mm and the chuck-to-chuck length was 100 mm, and its breaking strength was measured at a stretching rate of 200 mm/min. The breaking strength of the film thus measured was 3 MPa.

COMPARATIVE EXAMPLE 7:

The breaking strength of CM1021 was measured under the same condition as in Example 8, and it was 2 MPa.

COMPARATIVE EXAMPLE 8

A thermoplastic resin composition was prepared in the same manner as in Example 8 except that the liquid-crystalline resin of Comparative Example 2 was used in place of the liquid-crystalline resin of Example 1. This was press-shaped at 255° C. into a non-drawn film having a thickness of 100 μm. Using the T. M. Long's film stretcher, the film was biaxially drawn 3-fold in both the MD and TD directions at 90° C., but was broken. In this, good films could not be obtained.

EXAMPLE 9

Using a 40 mm φ single-screw extruder equipped with a 6-hole spinneret of which each hole had a diameter of 0.4 mm φ, the polyamide resin composition of Example 8 was melt-spun through the spinneret at a spinning temperature of 255° C. and a take-up speed of 70 m/min. The thus-spun thread was set in a Tensilon-type tensile strength tester (manufactured by Orientec Co.) in such a manner that the chuck-to-chuck length was 100 mm, and its breaking strength was measured at a stretching rate of 200 mm/min. The breaking strength of the thread thus measured was 8 g/d.

COMPARATIVE EXAMPLE 9

The breaking strength of the polyamide resin of Comparative Example 7 was measured under the same condition as in Example 9, and it was 6 g/d.

TABLE 1

| | Thermoplastic Resin | Liquid-Crystalline Resin (wt. pts.) | Filler (wt. pts.) | Tensile Strength (MPa) | Dwell-Time Yellowing | Molding Stability (number of failed samples) | Surface Appearance | Working Temperature (° C.) | Mold Temperature (° C.) |
|---|---|---|---|---|---|---|---|---|---|
| Example 4 | | A-1 (100) | GF (35) | 160 | ○ | 0 | ○ | 280 | 90 |
| Example 5 | A-4 | A-1 (2) | GF (35) | 155 | ○ | 0 | ○ | 280 | 90 |
| Example 6 | N-66 | A-2 (1) | GF (100) | 210 | ○ | 2 | ○ | 285 | 80 |
| Example 7 | PET | A-3 (1) | GF (35) | 137 | ○ | 1 | ○ | 280 | 120 |
| Comparative Example 3 | N-66 | — | GF (100) | 190 | X | 16 | X | 285 | 80 |
| Comparative Example 4 | PET | — | GF (35) | 120 | Δ | 14 | Δ | 280 | 120 |
| Comparative Example 5 | — | A-4 (100) | GF (35) | 145 | ○ | 10 | ○ | 280 | 90 |
| Comparative Example 6 | PET | A-5 (1) | GF (35) | 125 | Δ | 14 | Δ | 280 | 120 |

COMPARATIVE EXAMPLE 10:

Using the 40 mm φ single-screw extruder equipped with a 6-hole spinneret of which each hole had a diameter of 0.4 mm φ, the polyamide resin composition of Comparative Example 8 was melt-spun through the spinneret at a spinning temperature of 255° C. and a take-up speed of 70 m/min, but the thread being spun was cut.

From the data in Table 1 and those in Examples 8 and 9 and Comparative Examples 7 to 10, it is known that the liquid-crystalline resin of the invention and also the thermoplastic resin composition comprising the liquid-crystalline resin can be formed into good moldings, films and fibers, of which the tensile strength, the dwell-time yellowing resistance in working, the molding stability (to reduce the yield of failed moldings owing to the resin filling shortage and the mold release failure), and the surface appearance are all good.

While the invention has been described in detail and with reference to specific embodiments thereof, it will be apparent to one skilled in the art that various changes and modifications can be made therein without departing from the spirit and scope thereof.

What is claimed is:

1. A liquid-crystalline resin having ester bonds, which has a hydroxyl terminal concentration of not smaller than about $15 \times 10^{-6}$ equivalents/g and up to $1000 \times 10^{-6}$ equivalents/g.

2. The liquid-crystalline resin as claimed in claim 1, which contains p-hydroxybenzoic acid residues.

3. The liquid-crystalline resin as claimed in claim 1, which contains ethylenedioxy units.

4. The liquid-crystalline resin as claimed in claim 1, which comprises a liquid-crystalline polyester having structural units of the following (I), (III) and (IV), and/or a liquid-crystalline polyester having structural units of the following (I), (II), (III) and (IV):

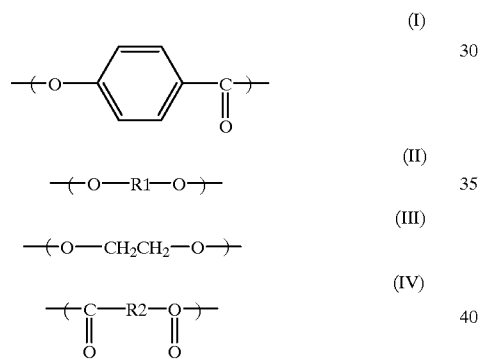

wherein R1 represents at least one or more groups selected from the following group consisting of:

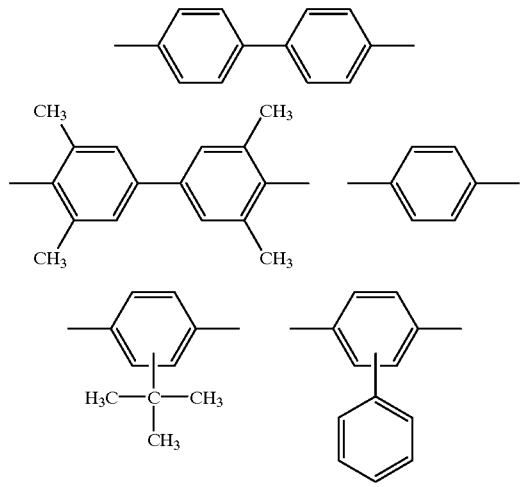

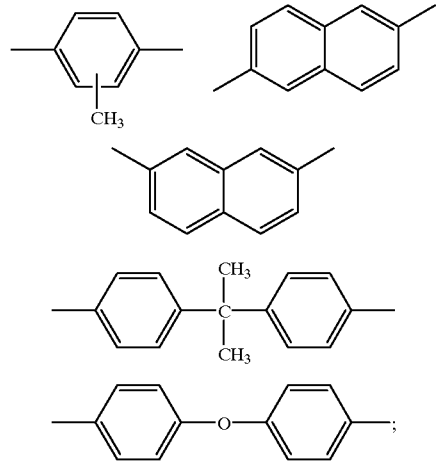

R2 represents at least one or more groups selected from the following group consisting of:

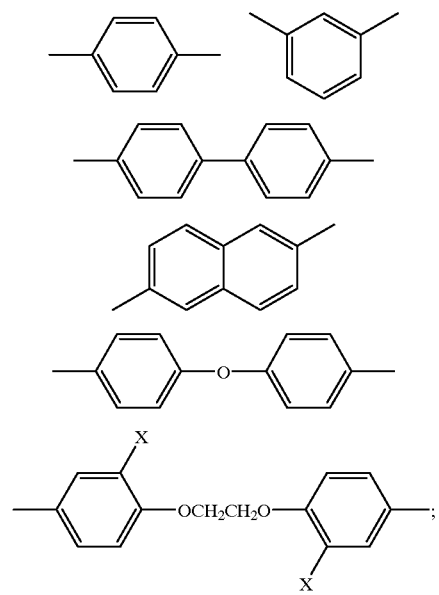

X represents a hydrogen atom or a chlorine atom.

5. The liquid-crystalline resin as claimed in claim 4, wherein the total of the structural units (I) and (II) is 35 to 95 mol % of the total of the structural units (I), (II) and (III), the structural units (III) are 5 to 65 mol % of the total of the structural units (I), (II) and (III), the molar ratio of the structural units (I) to (II), (I)/(II), is 70/30 to 95/5, and the structural units (IV) are substantially equimolar to the total of the structural units (II) and (III).

6. A liquid-crystalline resin composition comprising 100 parts by weight of the liquid-crystalline resin of claim 1, and 5 to 300 parts by weight of a filler.

7. A thermoplastic resin composition comprising 100 parts by weight of a thermoplastic resin and 0.01 to 30 parts by weight of the liquid-crystalline resin of claim 1.

8. A thermoplastic resin composition as claimed in claim 7, further comprising 5 to 300 parts by weight of a filler relative to 100 parts by weight of the total amounts of the thermoplastic resin and the liquid-crystalline resin.

9. The thermoplastic resin composition as claimed in claim 7, wherein the liquid-crystalline resin has a number-average molecular weight of not larger than 5000.

10. A thermoplastic resin composition comprising 100 parts by weight of a thermoplastic resin and 0.01 to 30 parts by weight of a liquid-crystalline resin having a hydroxyl terminal concentration of not smaller than $15 \times 10^{-6}$ equivalents/g, of which the tensile strength as measured according to the method of ASTM D638 (for a sheet sample of the composition having a thickness of 1/8 inches) is at least 5% higher than that of the thermoplastic resin not combined with the liquid-crystalline resin.

11. Moldings of the thermoplastic resin composition of claim 7.

12. Films of the thermoplastic resin composition of claim 7.

13. Fibers of the thermoplastic resin composition of claim 7.

14. The thermoplastic resin composition of claim 7, further comprising not more than about 100 ppm by weight of red phosphorus.

15. The thermoplastic resin composition of claim 14, further comprising by weight about 0.01 to about 20 percent of at least one metal oxide relative to said liquid-crystalline resin.

16. The thermoplastic resin composition of claim 7, further comprising by weight about 0.01 to about 10 percent of at least one fluorine resin relative to said liquid-crystalline resin.

17. The liquid-crystalline resin of claim 1, produced by a process comprising:

a) carrying out a polycondensation reaction of appropriate reactants to produce a conventional polyester; and b) adding to said polyester by weight about 0.01 to about 5 percent of at least one substance selected from the group consisting of water and glycol.

18. The liquid-crystalline resin of claim 17, further processed by melting and pelletizing in a kneader or extruder at a temperature in a range of about 180° C. to about 380° C.

19. The liquid-crystalline resin of claim 1, wherein said number-average molecular weight is at least 500.

20. A liquid-crystalline resin having ester bonds, which is produced by deacetylating polycondensation, which has a hydroxyl terminal concentration of not smaller than $1.5 \times 10^{-6}$ equivalents/g and up to $1000 \times 10^{-6}$ equivalents/g.

* * * * *